Dec. 3, 1940.   W. M. FILBEN   2,223,486

TOASTER

Filed Oct. 17, 1938    2 Sheets-Sheet 1

Inventor
William M. Filben
By Howard L. Fisher
Attorney

Dec. 3, 1940. W. M. FILBEN 2,223,486
TOASTER
Filed Oct. 17, 1938 2 Sheets-Sheet 2
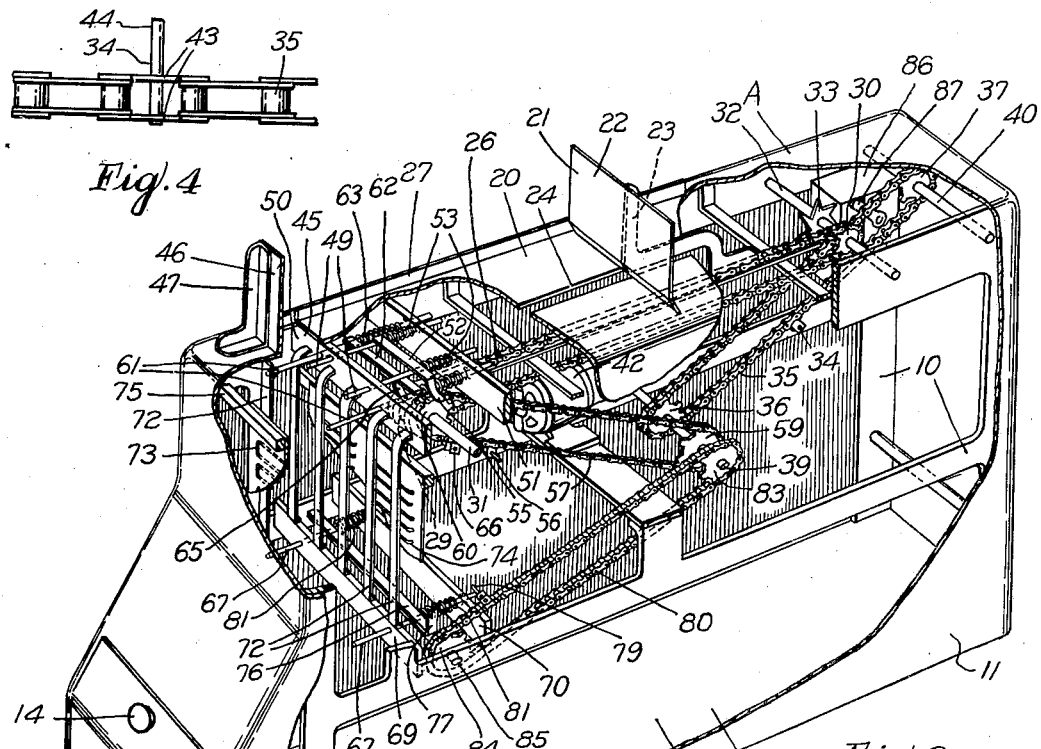
Fig. 4
Fig. 3
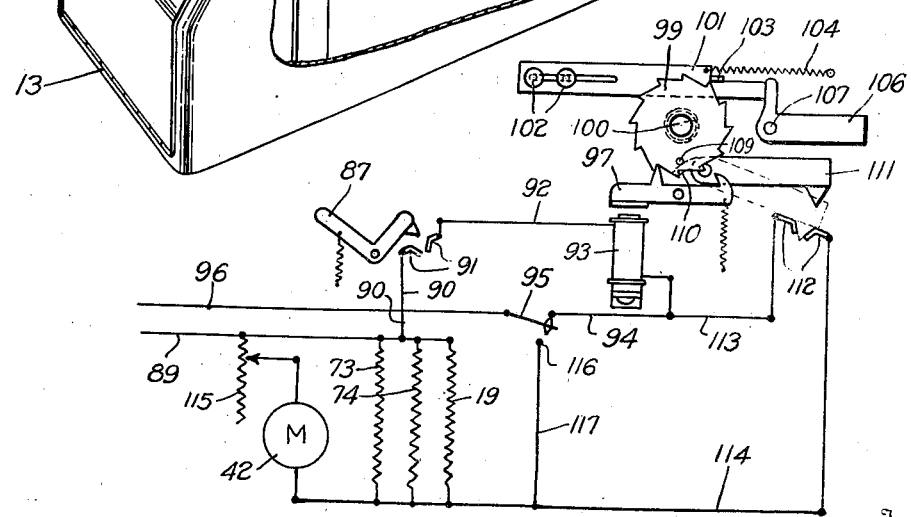
Fig. 5
Inventor
William M. Filben
By Howard Fischer
Attorney Patented Dec. 3, 1940

2,223,486

UNITED STATES PATENT OFFICE 2,223,486

TOASTER

William M. Filben, St. Paul, Minn.

Application October 17, 1938, Serial No. 235,366

15 Claims. (Cl. 219—19)

My invention relates to an improvement in automatic toasters wherein it is desired to provide a device capable of toasting a series of slices of bread one after another.

Many types of toasters have been previously constructed. In these toasters, however, it is ordinarily necessary to insert slices of bread into a suitable holder and to remove the toast from position after the toasting operation is completed. Furthermore, in most previous types of toasters, it has been necessary to remove the toast and to provide a separate means of keeping this toast warm if it is desired to do so.

It is an object of my invention to provide a toaster which accommodates a loaf of bread or any portion of a loaf of bread and which acts automatically to feed the bread one slice at a time between toasting elements. Sufficient time is provided for the bread to be toasted, whereupon the toasted bread is moved out of toasted position and another slice of bread to be toasted is fed between the elements.

It is a feature of my invention to provide a toaster capable of operating continuously to toast an entire loaf of bread or to toast any predetermined number of slices of toast. My toaster is provided with a counting device which may be set so that the machine will toast any predetermined number of slices and then stop. Thus, if it is usual to provide three pieces of toast to an order of toast, the toaster may be set to toast three, six, or nine slices. If individual slices of toast are desired in addition to the regular orders, it is only necessary to set this counting device to cause the machine to continue operation until the desired amount of toast is prepared.

It is a feature of my invention to provide a toaster capable of supporting a loaf of bread or any portion of a loaf and to provide a means of moving the loaf so that one slice at a time is fed into the toaster. The loaf may be placed in feeding position and a pushing device is provided which engages one end of the loaf to advance the same piece by piece.

It is a further purpose of my invention to provide a toaster which is operated by a series of slides or triggers and to provide a toaster in which the bread is dropped by gravity from feeding position into toasting position and from toasting position into warming position wherein the toast is maintained at a warm temperature. Obviously, with this construction, it is not necessary for me to provide a means of manually or automatically carrying the slices of bread into and out of toasting position, as these movements are accomplished by gravity and it is only necessary to feed one slice of bread at a time into feeding position in order to operate my toaster properly.

It is a feature of my invention that the speed with which the toaster operates may be varied so that the bread may be toasted a desired amount. With this means the toast remains adjacent the toasting elements a longer or shorter time at the will of the operator.

These and other objects and novel features of my invention will be more clearly and fully set forth in the following specification and claims.

In the drawings forming a part of my specification:

Figure 3 is a perspective view of a toaster, portions of the same having been cut away to disclose the construction of the various parts.

Figure 4 is a detail view of one of the operating chains of my toaster.

Figure 5 is a diagram of the wiring of my toaster.

Figure 1:
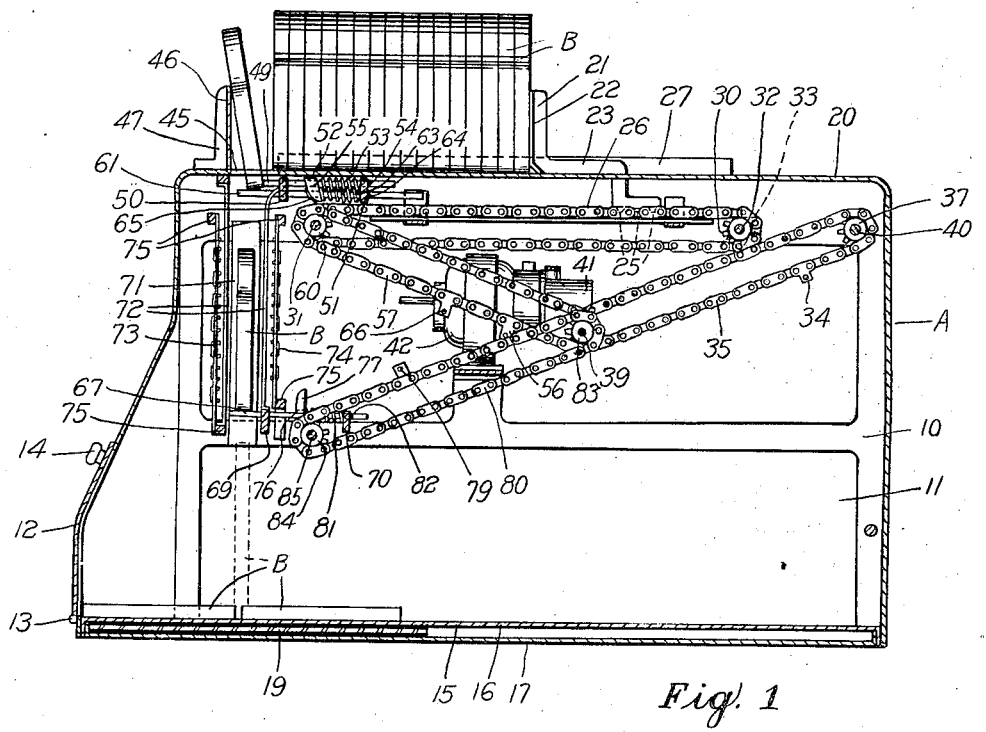
Figure 1 is a vertical section through the toaster, illustrating the arrangement of the various parts thereof.
Figure 2:
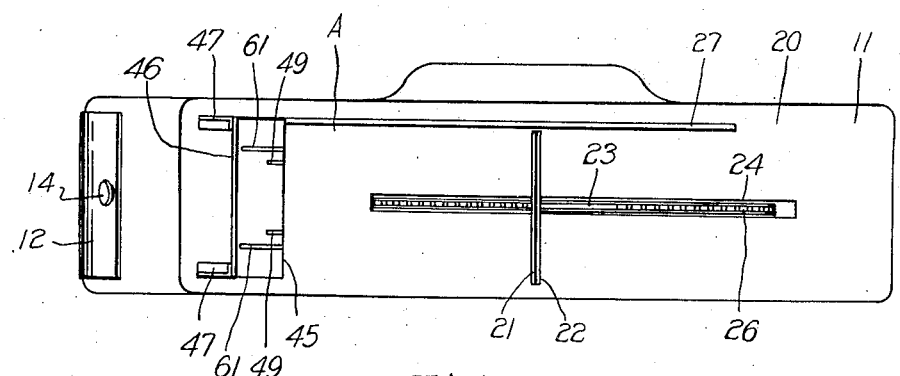
Figure 2 is a top plan view of the toaster.

The toaster A comprises a frame 10 having an enclosing casing 11 surrounding the same. This casing is provided with a door 12 pivoted at 13 and having a knob 14 by means of which the door may be opened and toast within the casing 11 removed. The floor 15 of the casing is preferably formed of two spaced sheets 16 and 17 between which a heating element 19 may be positioned. This heating element 19 is designed to maintain a warm temperature within the confines of the casing 11 and to keep toast such as B resting upon the same or above the same, at a warm temperature.

A loaf of bread B may be rested upon the top 20 of the casing 11 and one end of the loaf is supported by means of a pusher 21. The pusher 21 comprises a vertical pushing plate 22, the lower edge of which may engage the top 20 of the casing 11 and a bracket 23 which engages the pusher plate 22 centrally and which extends through a slot 24 in the top 20 of the casing 11. The extreme end of the bracket 23 is provided with a series of fingers 25 which engage between adjacent links of a chain 26. The manner in which the pusher 21 engages the bread and the chain is best illustrated in Figures 1 and 3 of the drawings. A guide rail 27 is secured to the top 20 of the casing 11 and engages one edge of each slice of bread B to hold the slices in proper alignment.

The chain 26 is supported upon sprockets 29 and 30 on transversely extending shafts 31 and 32 respectively, extending between opposite sides of the frame 10. On the shaft 32 I provide a ratchet 33 which is designed to be actuated by a lug 34 on an adjacent chain 35. The chain 35 is supported upon sprockets 36 and 37 which are mounted upon shafts 39 and 40 respectively. The shaft 39 is a power shaft as it is permanently geared through suitable reduction gearing 41 to the motor 42. The shaft 40 extends between opposite sides of the frame 10 and is so located that the lug 34 thereupon will engage one tooth of the ratchet 33 and will rotate the shaft 32 through a certain desired angularity each time the lug 34 passes the ratchet. Thus each time the lug 34 moves through a complete cycle, the chain 26 is advanced slightly, carrying the pusher 21 which in turn pushes the bread B.

The lug 34 may be of any suitable type but is shown in one form in Figure 4. One link of the chain 35 is provided with a pair of upstanding ears 43 through which a pin 44 may extend. In the movement of the chain 35 the pin 44 strikes the ratchet 33 causing it to rotate through a certain predetermined angular movement.

A slot 45 is provided in the top 20 of the casing and an end support 46 is supported by supporting brackets 47 adjacent this slot 45. This end support 46 is to support individual slices of bread which are in feeding position and will be dropped into the toaster upon operation of the mechanism. In order to support and properly position the slices of bread, two sets of slidable rods are provided. Shorter rods 49 are longitudinally slidably journalled in cross members 50 and 51 of the frame. These rods 49 are connected with a cross brace 52 to move in unison and springs 53 which are interposed around the rods between the cross arm 52 and the cross member 51 hold these rods usually in extended position extending partially across the slot 45. Keys 54 are provided to limit the outward movement of these rods. The cross brace 52 is provided with a cam lip 55 on the end of the same which is designed to engage a lug 56 on the chain 57. The chain 57 is supported by a sprocket 59 on the motor shaft 39 and a sprocket 60 on the shaft 31. The sprocket 60 rotates freely upon the shaft 31. The lug 56 is similar to the lug 34 on the chain 35; and in the rotation of the chain 57 this lug 56 engages the cam lip 55 and retracts the rods 49, compressing the springs 53, and then upon continued rotation of the chain 57 releases the lip 55 and allows the rods 49 to assume their normal position.

A second set of supporting rods 61 extend across the opening 45 and prevent the bread B from dropping through the slot. These rods 61 are connected by a cross brace 62 so that the rods act in unison and are journalled in the cross members 50 and 51. Springs 63 encircle the rods 61 and are positioned between the cross brace 62 and the cross member 51 on the frame 10. Keys 64 through the rods 61 limit the outward movement of these rods. A cam lip 65 is secured to the cross brace 62 and is actuated by a lug 66 on the chain 57. The lug 66 is in advance of the lug 56. After a slice of toast is dropped by means of the lug 66 engaging the lip 65 to retract the rod 61, the bread is advanced and is properly positioned by the rods 49.

A series of rods 67 are slidably supported by transverse frame members 69 and 70 in the path of toast which has been dropped by the rod 61. The toast is maintained in vertical position by side guide means 71 and by guides 72. Heating elements 73 and 74 are positioned adjacent the guides 72 to toast the bread supported between these guides. The heating elements are mounted in any desired manner and are shown as supported upon mica plates or the like which are held in proper position by transverse braces such as 75. The bread is supported in toasting position by means of the rods 67. A cross member 76 connects the rods 67 and is provided with a cam lip 77 which is engageable with a lug 79 on the chain 80. Springs 81 are positioned on the rods 67 and interposed between the cross brace 76 and the transverse frame member 70. These springs hold the rods 67 ordinarily in position to block the passage and to support the toast thereupon. Pin means 82 extends through the rod 67 to limit the outward movement thereof. When the lug 79 engages the cam lip 77, the rods 67 are retracted, permitting the toast to drop into the lower portion of the casing 11 where it is kept warm by means of the heating element 19.

The chain 80 is supported between a sprocket 83 on the motor shaft 39 and a sprocket 84 on a transverse shaft 85. This chain similarly to chains 35 and 37 operates continuously when the motor 42 is turned on causing the various movements of the toaster to take place in a regular cycle.

A control box 86 is mounted on the frame 10 and is provided with a lever 87 which is operated by a lug on one of the chains so that it may be operated once during each cycle of operation. In the drawings, this control box 86 is shown adjacent the chain 35 for operation by the lug 34 or by another suitably positioned lug mounted upon this chain. This lever 87 is shown diagrammatically in Figure 5 of the drawings, and it will be seen that actuation of this lever acts to close a circuit from one line wire 89 through the conductor 90 and the normally spaced contacts 91, the conductor 92, the magnet 93, the conductor 94, switch 95, to the opposite line wire 96. Thus each time the lever 87 is operated, a circuit is closed to the magnet 93.

The magnet 93 operates the escapement lever 97 which is used in conjunction with the escapement wheel 99. This wheel 99 normally has a tendency to rotate in a counter-clockwise direction, this tendency being provided by a spring 100. The spring 100 is wound up by means of a slidable ratchet 101 which is slidably supported by means such as 102 and which is equipped with a pivoted dog 103 which engages a tooth of the escapement wheel 99 to rotate this wheel in a clockwise direction against the tension of the spring 100. A spring 104 normally draws the slide ratchet 101 to the position illustrated in Figure 5, but a manually operable bell crank 106 pivoted at 107 engages an end of this slidable ratchet to force the same to the left. Thus each time the lever 106 is manually pivoted by the operator, the slide ratchet 101 is forced to the left until the pivoted dog 103 engages a tooth of the escapement wheel 99. The lever 106 when released is rotated back into normal position by the spring 104 which is sufficiently strong to rotate the escapement wheel 99 in a clockwise direction in spite of the weaker spring 100. If the lever 106 is pivoted several times in succession, the escapement wheel 99 will be rotated through the angular distance of a corresponding number of teeth.

The escapement wheel 99 is provided with a pin 109 which engages the cam end 110 of a switch arm 111. This pin 109 in active position engages the cam end 110 to hold the switch arm 111 out of contact with the contacts 112. However, when the lever 106 is operated, the pin 109 is rotated out of contact with the cam end 110 and the switch lever 111 pivots into engagement with the contacts 112. This action closes a circuit from the line wire 96 through the switch 95 and a portion of the conductor 94, through a conductor 113 and the contacts 112, a conductor 114, to the various heating elements 73, 74 and 19, as well as through the motor 42. A rheostat 115 is secured in series with the motor 42 to vary the speed of the motor. Thus as long as the switch arm 111 remains in contact with the contacts 112, the motor 42 will operate and the toasting and heating elements will be energized. The various chains connected to sprockets on the motor shaft 39 will be rotated. When the lug 34 or any suitable lug on the chain 35 engages the arm 87, however, a circuit will be closed to the magnet 93 which will pivot the escapement lever 97 and permit the escapement wheel 99 to rotate in a counter-clockwise direction the distance of one tooth. Therefore, for each revolution of the chain 35, the escapement wheel 99 rotates the distance of one tooth until the pin 109 engages the cam end 110 of the lever 111 breaking circuit between the contacts 112.

From this explanation, it will be obvious that if the lever 106 is manually actuated once the escapement wheel 99 will only be rotated a distance of one tooth in a clockwise direction, and therefore the first time the circuit to the magnet 93 is operated, the pin 109 will raise the switch arm 111 and the motor and heating elements will be de-energized. If, however, the lever 106 is operated three times, the escapement wheel 99 will be wound up through a distance of three teeth and three revolutions of the chain 35 will be made before the machine turns off, thus toasting three slices of bread.

The operation of the device has for the most part been explained together with the foregoing description. The motor 42 drives the shaft 39 from which three chains of equal length extent. One of these chains operates the conveyor chain 26 which moves the loaf of bread forwardly. The chain 57 operates the rods 49 to agitate the bread and to push the bottom of the slice into feeding position. This chain 57 also subsequently operates the rods 61 which release the slice of bread and drop the same into toasting position resting upon the rods 67. At the end of the toasting period, the rods 67 are operated by a lug 79 on the chain 80 which permits the toasted bread to drop to the bottom of the container. By this time another slice of bread has been properly positioned upon the rods 61 and if the operation of the machine is not interrupted, another slice of bread will be dropped into toasting position. The ratchet wheel 33 is of proper size to rotate the chain 26 through the proper distance to move the loaf of bread B the distance of the thickness of one piece of bread.

If it is desired to operate the toaster A continuously, the switch 95 is moved into engagement with the contact 116 which communicates with a conductor 117, closing a circuit directly from the line wire 96 to the toasting and heating elements and to the motor 42. When the switch 95 is in this position, the motor 42 will continue operation until turned off. An entire loaf of bread may thus be toasted one slice at a time without operating the lever 106 in this manner.

In accordance with the patent statutes, I have described the principles of construction and operation of my toaster; and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A toaster comprising a releasable means for supporting a slice of bread, stationary means for heating said bread while supported in stationary position to toast the same, timing means for releasing said releasable supporting means for said slice of bread to permit the same to fall by gravity out of said stationary toasting position, releasable means for supporting a slice of bread stationary above the level of said toasting position, and means forming a part of said timing means for releasing said supporting means to permit said bread to drop from one stationary position into toasting position.

2. A toaster comprising a toast compartment, a releasable means for supporting a slice of bread stationary above said toast compartment, means for heating the bread while supported in said stationary position to toast the same, timing means for releasing said supporting means from said slice of bread to permit the same to drop by gravity into said toast compartment, and means controlled by said timing means for feeding a second slice of bread onto said supporting means.

3. A toaster comprising a base, trigger means for supporting a slice of bread stationary above said base, means for toasting said bread while supported, timing means for releasing said supporting means to permit the same to drop by gravity out of toasting position, means for supporting a second slice of bread above the level of said trigger means, and means forming a part of said timing means for releasing said last named supporting means to drop said second slice of bread into toasting position.

4. A toaster comprising a base, a trigger means above said base for supporting a slice of bread, means for toasting said bread while supported, means for releasing said supporting trigger means to drop said toast, means for supporting a series of slices of bread above the level of said toasting position, trigger means for supporting one slice of said series of slices and timing means for feeding, said bread intermittently into toasting position and for actuating said trigger means.

5. A toaster comprising a trigger means for supporting a slice of bread, means for toasting said bread while supported, means for releasing said trigger means for said supported bread to permit said bread to drop out of toasting position, means above the level of said toasting position to support a series of slices of bread, releasable means supporting one of the slices of said series, means for releasing said releasable means, and means for moving said slices to move another slice of bread onto said releasable means.

6. A toaster including a base, a releasable trigger means for supporting a slice of bread above said base, means for toasting said bread while supported, means for supporting a series of slices of bread above the lever of said toasting means, a second trigger means supporting one slice of said series, means for releasing said first named trigger means to drop a slice of toast onto said base, and means for releasing said second trigger means to drop the slice of bread thereupon onto said first named trigger means.

7. A toaster comprising a means for supporting a series of slices of bread in loaf form, a base substantially beneath said supporting means, a slot in said supporting means through which the end slice of bread may be dropped at a time from said loaf by gravity, slidable trigger means below the level of said supporting means for catching the slice of bread dropped, means for toasting the slice of bread when caught, means for sliding said trigger means from beneath said slice to drop the slice of toasted bread thereupon onto said base, and means for subsequently feeding another slice of bread through said slot.

8. A toaster comprising a means for supporting a loaf of bread, means for advancing said loaf along said supporting means the distance of a slice of bread at timed intervals, means for guiding a slice of bread from said supporting means to fall by gravity, trigger normally stationary means for interrupting the fall of said bread holding said slice of bread stationary, means for toasting said stationary slice of bread while supported on said trigger means, and timing means for releasing said trigger means when said bread is toasted to permit said bread to drop by gravity from interrupted position.

9. A toaster comprising a support for a series of slices of bread, ratchet means for moving said slices forwardly the distance of a slice at a time, trigger means below the level of said support for supporting one slice of said series, a second trigger means below the level of said first trigger means, heating elements for toasting bread supported on said second trigger means, a storage receptacle beneath said second trigger means, and timing means including means for releasing said second trigger means to drop the toasted bread, means for subsequently actuating said first trigger means to drop another slice of bread onto said second trigger means, and means for actuating said ratchet for moving said series of slices to move another slice onto said first trigger means.

10. A toaster comprising a support for a slice of bread, heating means for toasting said bread while supported, and trigger means above said first named supporting means, said trigger means comprising a series of longitudinally slidable rods, means connecting said rods to permit the same to move in unison, means resiliently holding said rods in position to support a slice of bread thereupon, trip means connected to said rods for sliding the same, and timing means for actuating said trip to retract said rods against the tension of said resilient means momentarily to drop a slice of bread into toasting position.

11. A toaster comprising a trigger including a slidable support, means normally urging said support in position to engage and hold a slice of bread stationary, means for toasting the slice of bread while stationarily supported on said trigger, a second trigger above the level of said first trigger, said second trigger also comprising a slidable member and means normally urging said slidable member into position to support a slice of bread stationary, trip means on said triggers, and timing means engaging said trip means only at definite timed intervals to first trip said first trigger and subsequently trip said second trigger.

12. In a toaster, a support for a series of slices of bread, an opening at one end of said support for receiving a single slice of bread, heating elements for toasting the slice of bread dropped through said opening, a slot longitudinally extending in said support, a chain mounted beneath said slot, and means for moving said series of slices of bread comprising a plate designed to engage against the end slice of bread, and an arm on said plate extending through said slot into engagement with said chain.

13. A toaster comprising a support for a loaf of bread, said support having an opening therethrough through which a single slice of bread may drop, means supporting a dropped slice of bread, means toasting said supported slice, said support having a longitudinally extending slot therein, a plate engaging the end slice of bread of said loaf, means on said plate extending through said slot removably engageable with said chain, and means for moving said chain to advance said loaf of bread on said support.

14. A toaster including a support for a series of slices of bread, guiding means for guiding one end slice of said series into toasting position, means supporting said slice in toasting position, means toasting said supported slice, an elongated slot in said support for said series of slices, a pusher plate designed to engage the other end slice of said series of slices, a chain mounted for movement beneath said slot, means on said pusher plate engaging said chain for movement thereby, and means for moving said chain to move said series of slices.

15. A toaster comprising a support for a series of slices of bread, guide means for guiding an end slice of said series in the toasting position, means for toasting said bread while in toasting position, an elongated slot in said support, a pusher plate engageable with the other end slice of said series, a chain supported for movement beneath said slot, means on said pusher plate engaging said chain, ratchet means for moving said chain, and means for intermittently operating said ratchet means to move said series of slices.

WILLIAM M. FILBEN.

CERTIFICATE OF CORRECTION.

Patent No. 2,223,486.  December 3, 1940.

WILLIAM M. FIIBEN.

It is hereby certified that error appears in the printed specification of the above numbered patent requiring correction as follows: Page 3, second column, line 12, claim 1, for "bread, stationary" read --bread stationary,--; line 71, claim 6, for the word "lever" read --level--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.